Figure 3:
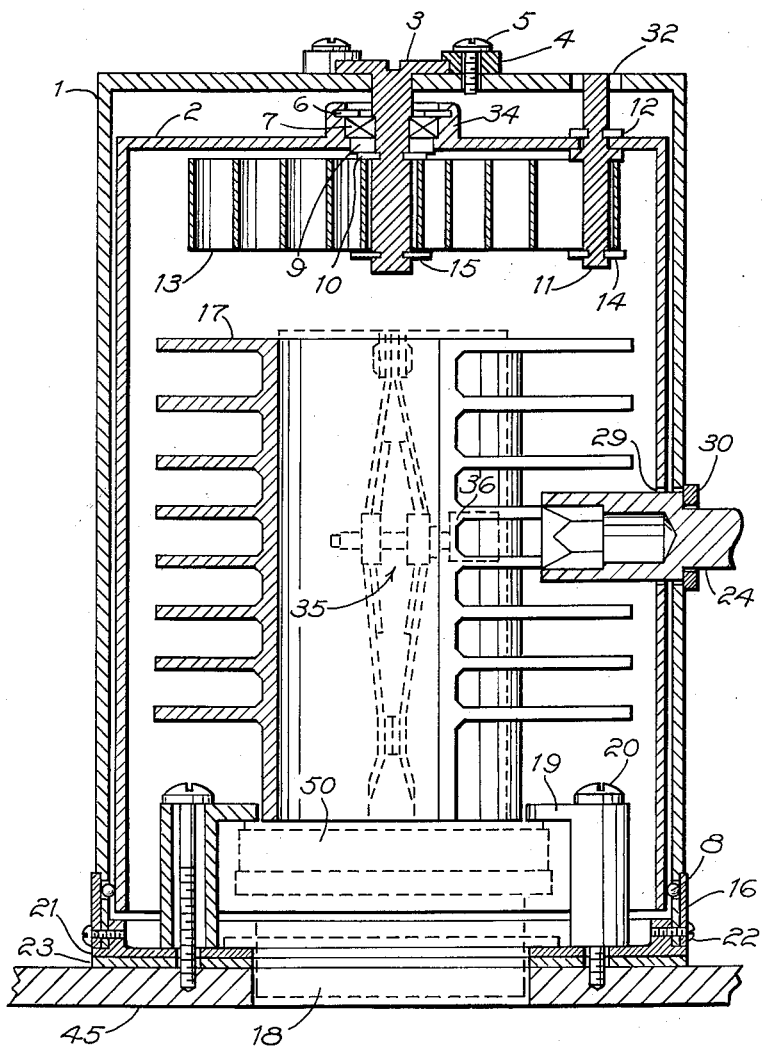

May 7, 1963  B. R. HALLFORD ETAL  3,088,673
TEMPERATURE REGULATED CHAMBER
Filed Aug. 1, 1960   4 Sheets-Sheet 1
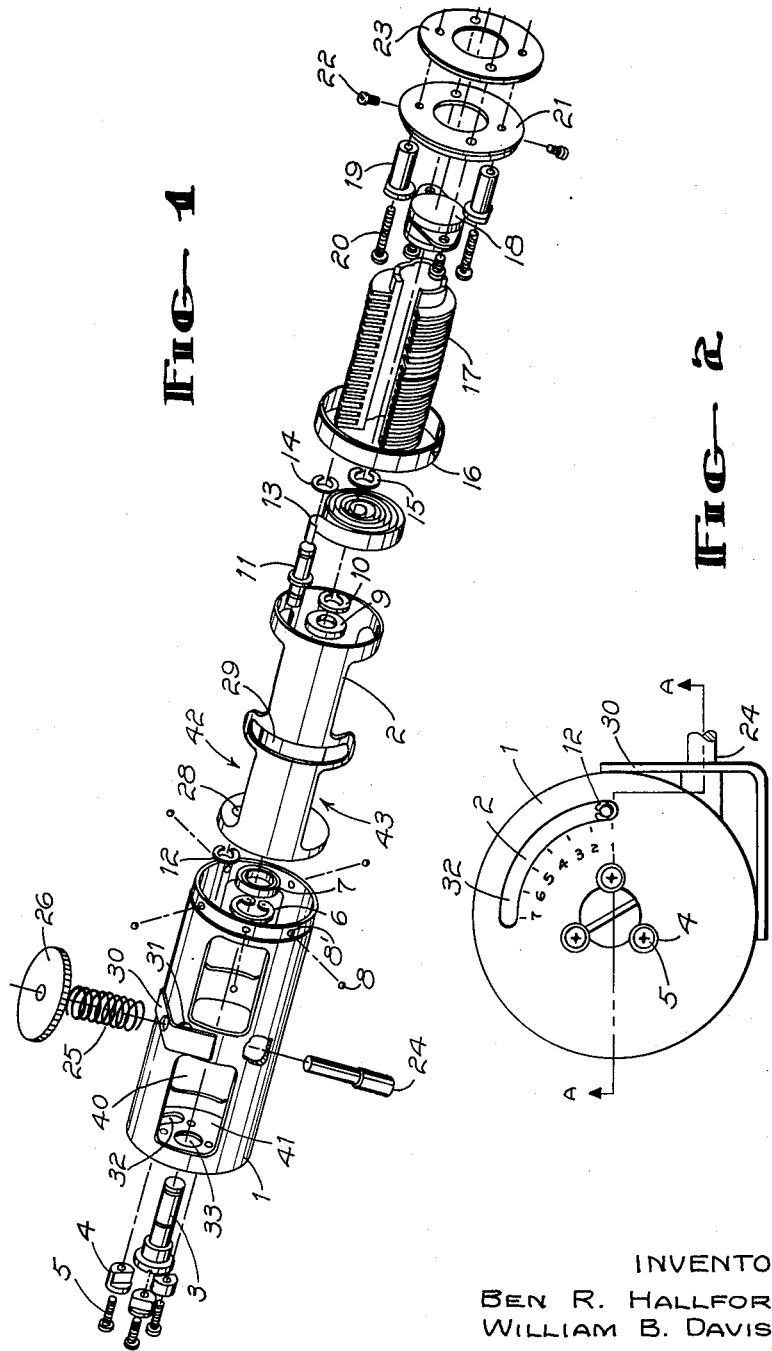
INVENTORS
BEN R. HALLFORD
WILLIAM B. DAVIS
BY
*Moody & Anderson*
AGENTS

INVENTORS
BEN R. HALLFORD
WILLIAM B. DAVIS
BY

*Moody & Anderson*

AGENTS

May 7, 1963   B. R. HALLFORD ETAL   3,088,673
TEMPERATURE REGULATED CHAMBER
Filed Aug. 1, 1960   4 Sheets-Sheet 3

INVENTORS
BEN R. HALLFORD
WILLIAM B. DAVIS
BY

*Moody & Anderson*

AGENTS

May 7, 1963  B. R. HALLFORD ETAL  3,088,673
TEMPERATURE REGULATED CHAMBER
Filed Aug. 1, 1960  4 Sheets-Sheet 4
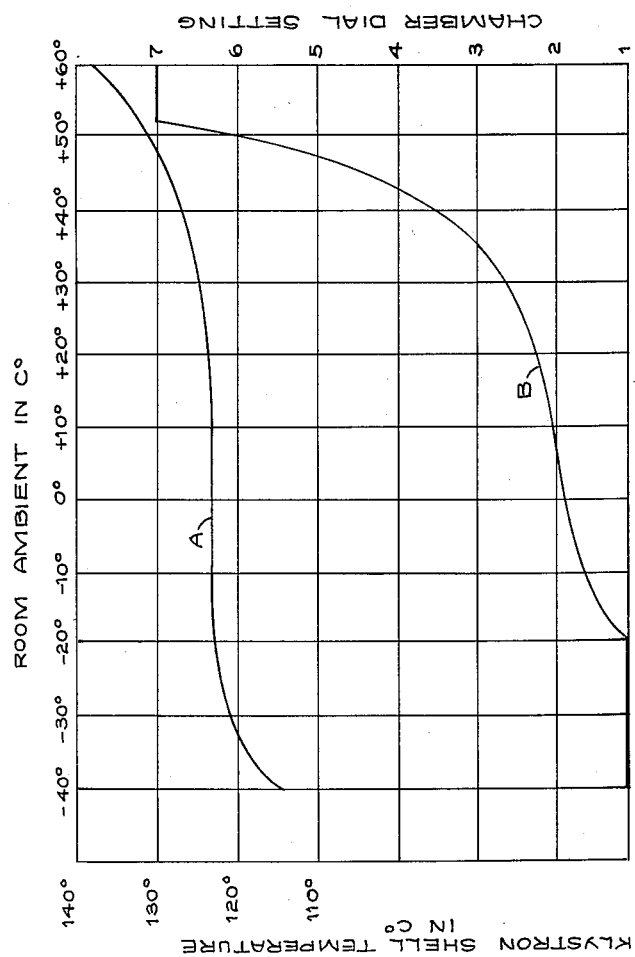
INVENTORS
BEN R. HALLFORD
WILLIAM B. DAVIS
BY
*Moody & Anderson*
AGENTS United States Patent Office 3,088,673
Patented May 7, 1963

3,088,673
TEMPERATURE REGULATED CHAMBER
Ben R. Hallford, Richardson, and William B. Davis, Garland, Tex., assignors to Collins Radio Company, Cedar Rapids, Iowa, a corporation of Iowa
Filed Aug. 1, 1960, Ser. No. 46,511
5 Claims. (Cl. 236—49)

This invention relates generally to temperature regulating devices and more particularly to an enclosure for maintaining a constant ambient temperature about an enclosed heat liberating element. Although not specifically limited thereto, the present invention might be particularly valuable as a temperature maintaining device for use in conjunction with an electronic tube, such as a klystron, wherein no external or internal heat source is incorporated except for the wattage continually being liberated by the enclosed klystron or other heat liberating device.

It is well known in the art that the embodiment of cavity resonating devices whose resonant frequency is heat dependent, such as the klystron, requires provision for the maintenance of a constant ambient temperature to insure that the oscillating frequency does not drift. For this reason, frequency generating devices such as klystrons, are ofttimes enclosed within temperature regulated ovens to insure the maintenance of a constant ambient temperature. A klystron might be incorporated in electronic equipment wherein the outside ambient temperature may vary from an extremely cold temperature to an extremely high temperature. In order to insure that the temperature of the frequency generating device remains constant, it is necessary to include means whereby an internal temperature stabilization is realized. Ovens inherently require a source of heater power and therefore may be undesirable should the associated equipment be operated from a battery power supply wherein any increase in the power requirement is obviously disadvantageous.

It is an object therefore of the present invention to provide a temperature regulating chamber which requires no external heat source or internal heat source except for the heat continuously being liberated by an enclosed, operating thermionic element such as, for example, a klystron.

A further object of the present invention is the provision of a temperature regulating chamber operable to maintain a more constant internal ambient temperature over an extremely wide range of external ambient temperature variation. The invention is featured in the provision of concentric cylindrical members formed with adjustable cooling slits which may collectively form either a closed or an open-type of construction upon relative rotation therebetween.

A further feature of the present invention is the provision of a temperature controlling chamber utilizing a novel combination of convection and reflection techniques whereby the temperature of an enclosed heat liberating element may be controlled in an exacting manner.

Still a further feature of the present invention is the provision of a temperature control chamber utilizing two closely fitted, concentric, cylindrical shells with coincident windows positioned in opposite walls of the cylinders including externally accessible tuning means communicating with the interior of the chamber in a novel manner which does not introduce any undesirable leakage between the relatively snug-fitting cylindrical members.

Figure 4:
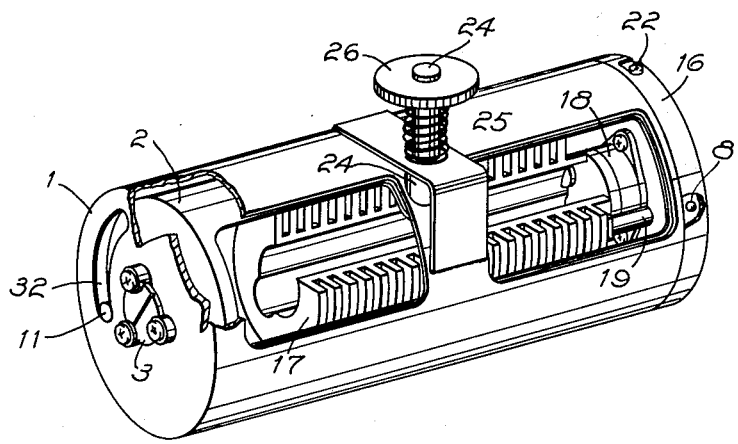
Figure 5:
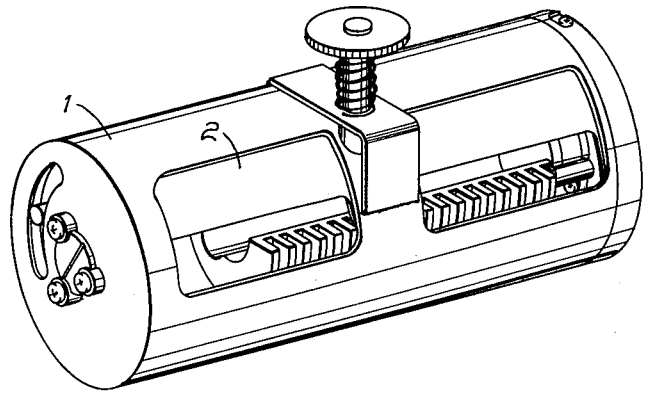

These and other features and objects of the present invention will become apparent upon reading the following description in conjunction with the accompanying drawings in which:

FIGURE 1 is an exploded isometric view of an embodiment of the present invention;
FIGURE 2 is a top view of the assembled chamber;
FIGURE 3 is a sectional elevation of the regulating chamber through section AA of FIGURE 2;
FIGURES 4 and 5 are assembled, isometric views of the chamber showing the slot-defining windows in coincidence and relative disalignment respectively; and
FIGURE 6 represents operating characteristics of an embodiment of the present invention.

With reference to FIGURES 1 and 4, the temperature regulating chamber of the present invention is seen to comprise a first-hollow cylindrical member 1 into which are formed longitudinally displaced diametrically opposed pairs of openings 40 and 41. A second or inner cylindrical member 2 is rotatably receivable within cylinder 1 and is formed with diametrically opposed cutout portions 42 and 43, which upon relative rotation between cylinders 1 and 2, may be aligned with windows 40 and 41 of cylinder 1 or disaligned in various degrees whereby the windows may be opened fully into the interior of cylinder 1 or may be completely closed off, depending upon the relative concentric positions of the cylinders.

A continuous circumferential portion of cylinder 1 is juxtaposed with a centrally located circumferential slot 29 formed in one wall of cylindrical member 2. Slot 29 provides clearance for a tuning tool 24 which is slideably received through a bracket 30 affixed to cylinder 1 and a through-hole 41 formed within cylinder 1 such that it may communicate with the interior of cylinder 1. The slot 29 formed in cylinder 2, receives the shank of tuning tool 24 throughout the necessary range of rotation of cylinder 2 within outer cylinder 1. The inner surfaces of cylinders 1 and 2 are formed with an optically polished surface which might preferably be gold plated; thus the chamber formed by the members 1 and 2 is cylindrically shaped with an inner wall which reflects heat back to an internally mounted heat radiating device. Relative rotation between members 1 and 2 will form a continuous inner reflecting surface or one with diametrically opposed slots of variable width determined by the degree of relative rotation between the cylinders.

The relative rotation between cylindrical members 1 and 2 is effected by incorporation of a spiral bimetallic spring member 13 which is located within the chamber. The inner and outer ends of spring 13 are affixed respectively to members 1 and 2. Spring member 13 uncoils in a known manner with temperature variation so as to impart a rotation of the inner cylinder member 2 with respect to the outer cylinder member 1. The cylinder 2 is rotatably mounted with respect to outer cylinder 1 by means of bearing assemblies which reduce friction to a minimum and precisely align inner cylinder 2 within cylinder 1 such that the concentric cylinders are closely fitted. For this purpose a bearing shaft 3 is received through an opening 33 formed in the end of cylinder 1. Shaft 3 is affixed to the end of cylinder 1 by means of clamp members 4 and mounting screws 5 such that the shaft might be rotated with respect to cylinder 1 and locked in any desired position.

With reference to FIGURE 3 the closed end of inner cylinder 2 is formed with a hollow cylindrical protrusion 34 into which a bearing member 7 may be seated and retained therein by means of a split-retaining ring 6 which locks into an internal groove within the protrusion 34. Bearing shaft 3 receives bearing 7 so as to allow rotation of cylinder 2 with respect to cylinder 1. The two cylinders are affixed axialy by means of a retaining ring 10 which seats into a groove formed around bearing shaft 3. A spacer member 9 is placed between bearing 7 and retaining ring 10; the spacer 9 bearing upon the inner face of bearing 7. The bimetallic spring is mounted concentrically about bearing shaft 3 and has the inner end thereof affixed to bearing shaft 3. The spring is held on bearing shaft 3 by means of a retaining ring 15 which seats in a groove formed in the shaft. The outer end of the bimetalic spring 13 is affixed to a stud member 11 by means of a retaining ring 14, with the stud member 11 being rotatably received in a through-hole 28 formed in the end of cylinder 2 and retained with respect to cylinder 2 by means of a retaining ring 12. Stud 11 is formed with in extended end thereof which communicates with an arcuate slot 32 formed through the end of outer cylinder 1. The communication between the end of stud 11 and arcuate slot 32 forms a positive mechanical limiting means for the relative rotation between cylinders 1 and 2.

Cylinders 1 and 2 are concentrically fitted as closely as possible. In order that the chamber may be closed as effectively as possible without introducing friction to oppose the relative rotation of the cylinders, a further bearing support means is included in the opposite end of the chamber to assure exacting concentricity of the cylinder members upon relative rotation therebetween. With reference to FIGURE 1, the bottom end of the outer cylinder 1 is formed with a reduced outside diameter through which are formed a plurality of through-holes 8' into which ball bearing members 8 may be rotatably retained. Bearings 8 are confined in contact with the inner cylinder member 2 by means of a bearing retaining ring 16 which slips over the reduced diameter end of cylinder 1 and is ultimately affixed to the chamber by means of mounting screws 22. A chamber base plate 21 is received within cylinder member 1 and provided with a flange to confine bearing retaining ring 16. As illustrated in FIGURE 3, the screws 22 are placed through retaining ring 16 and the outer cylinder member 1 to threaded engagement with the cylinder base plate 21.

FIGURE 3 illustrates a klystron tube 50 within the temperature regulated chamber, the tube and its socket 18 being indicated in phantom lines. The tube socket 18 is secured to the chamber base plate 21 by means of mounting screws 22 (FIGURE 1) and the tube 50 is clamped in the socket by means of clamping members 19 and screws 20 which extend through the clamping members and the base plate 21. To complete the construction, an insulating base member 23 formed from phenolic or other insulating material may be placed between the chamber base plate 21 and a mounting panel 45. The tube clamp mounting screws 20 may extend through the base members 21 and 23 to threaded engagement with the panel 45. Thus, the chamber may be secured to a chassis or other mounting plate by means of screws 20 and access to the tube may be gained by removing the mounting screws 22. The entire chamber may then be lifted from the tube leaving the tube socket and chamber base intact on the mounting panel 45.

The invention further provides a finned radiator member 17 which may be fitted over the tube jacket. In the case of the klystron embodiment illustrated, the finned radiator 17 is formed with a cut-out portion to permit access to the tuning strut mechanism 35 of the klystron. The assembly is mounted with respect to the klystron such that the rotatable adjusting screw 36 of the klystron is axially aligned with the tuning tool 24 which is mounted on the outer cylinder 1 as previously described and which, by means of a compression spring 25, is normally forceably withdrawn so as to be out of contact with the klystron adjusting screw 36. To tune the klystron, the control knob 26 is depressed against the spring 25 to effect engagement between the tool 24 and the klystron adjusting screw 36 and rotated to effect the desired tuning. It is seen that this tuning feature may be accomplished with the oven assembly intact about the internaly mounted tube.

The above-described construction of the temperature regulated chamber is seen to enclose the internal heat generating element within a chamber formed with diametrically opposed "windows" which may be opened or closed with temperature variation within the chamber by means of the bimetallic spring 13. A calibration means is provided by the adjustable mounting for the bearing shaft 3 which allows the shaft to be selectively positioned and locked to properly position the internal cylinder 2 with respect to the outer cylinder 1 at any desired calibration temperature. A dial is provided to indicate the relative "window" opening as illustrated in FIGURE 2.

The operation of the temperature regulated chamber is based upon the combined control of heat reflection back to the radiating element and the control of the convection flow of an external media through the diametrically opposed window openings past the fins of the radiator element surrounding the heat generating device. As above-described, the device makes use of an optically polished, gold-plated surfaces on the interior of the chamber to reflect heat from the inner chamber walls back to the radiating source, (in the illustrated embodiment, a klystron which might be dissipating 12 watts of power). The chamber additionally utilizes windows positioned in opposite walls thereof which open in proportion to the internal temperature of the chamber to simultaneously reduce the heat radiating area of the cylinder wall and increase convection flow of an external media past the fins of the radiator to form a double acting control of temperature.

The unique combined operation of the chamber and the radiator for a particular embodiment which was caused to be constructed may be described as follows.

At a high external ambient temperature limit of, for example, +60° C., heat is accumulated within the chamber, causing the bimetallic spiral spring 13 to rotate the inner cylinder 2, such that the openings of the inner cylinder 2 are aligned with the openings of the outer cylinder. In this position, as illustrated in FIGURE 4, the reflective surface area of the cylinder is reduced by approximately 50%. At the same time, the complete opening of the windows permits a maximum passage of media through the windows and past the radiating fins on the internal thermionic device. These combined actions permit a maximum amount of heat to be transferred from the thermionic device such as the klystron 50 to the surrounding media to lower the inside ambient temperature to the desired operating temperature.

Assuming now that the outside ambient temperature is decreased to that of normal room temperature (+26° C.) the bimetallic spiral spring 13 rotates the inside cylinder member 2, with respect to the outer cylinder 1, so that the effective window opening is reduced to approximately one-third its fully opened position. FIGURE 5 illustrates the device with the windows approximately ½ closed, indicating a higher external ambient temperature than for the condition of FIGURE 4. The reduction of the window opening increases the reflective surface area within the chamber and simultaneously limits the amount of air or external media which is permitted to flow through the chamber and past the radiating fins associated with the thermionic device. Consequently, the temperature within the chamber is stabilized to approximately the same temperature as that during the high outside ambient temperature limit.

Assuming further that the outside ambient temperature now drops to approximately −30° C., the bimetallic spring 13 effects a complete closing of the windows by rotating the inner cylinder member 2 to the limit stops; the limit stop being defined by the aforedescribed cooperation between the spring mounting stud 11 and arcuate slot 32 formed through the end of outer cylinder 1. With the windows completely closed, there is a cessation of the convection flow through the chamber. The action at this low outside ambient temperature and in the low range of outside ambient temperatures is considerably different from that of the high temperature in that the radiator 17 is no longer functional. The active element in this case is the gold-plated and polished interior surfaces of the two concentric cylindrical members 1 and 2. These surfaces now reflect approximately 98% of the heat radiated from the thermionic device back to the device. Thus, the heat being liberated from the thermionic device is conserved by the action of the gold-plated reflecting surface continuously reflecting and concentrating the radiated heat back to the centrally located heat radiating body.

FIGURE 6 illustrates graphically the temperature characteristics and control features of an embodiment of the present invention including a type QK753 klystron as the controlled element. Curve B shows the dial setting of FIGURE 6 as a function of equipment room ambient temperature. The chamber dial settings 1—7 are relative positions of pin member 11 of FIGURE 2 with respect to the outer cylinder 1. Dial settings 1 and 7 correspond to complete "window" closings and openings, respectively. Curve A shows a constant klystron shell temperature over a considerable range of room ambient temperature.

The temperature regulated chamber of the present invention is thus seen to provide a device which tends to rapidly expel the accumulated heat from the thermionic device during the presence of high outside ambient temperatures by action of the radiating fins and through the large open window areas which present a minimum impedance to the convection flow of outside air. This action is coupled with a simultaneous decrease in the reflecting inner surfaces of the chamber walls to approximately 60%. In the presence of low outside temperatures, the temperature chamber of the present invention provides an effective complete seal about the internal thermionic device due to the closely juxtaposed concentric cylinder members and convection flow is substantially eliminated while the internal radiating surfaces completely surround the thermionic device to reflect approximately 98% of the heat being radiated by this central body back to its source. The losses which are incurred through the walls of the chamber are replenished by the wattage continuously being generated by the interior body. In the illustrated embodiment, the klystron continuously radiated 12 watts of power in he form of heat. The radiator surrounding the thermionic device is a nonactive member in the performance of the temperature chamber when the otuside temperatures are low and has very little effect on the behavior of the chamber.

For usage as a temperature regulating device in conjunction with a klystron tube, the chamber function as a frequency controlling device for the klystron or other similar electronic device which depends upon the maintenance of a constant temperature for frequency stability.

Although the invention has been described with respect to a particular embodiment thereof, it is not to be so limited as changes might be made therein which fall within the scope of the invention as defined by the appended claims.

We claim:
1. A temperature regulated chamber for maintenance of a constant temperature about an internally confined heat radiating device comprising first and second hollow cylindrical members each formed with diametrically opposed openings therethrough, means for mounting said second cylindrical member concentrically within and rotatably with respect to said first cylindrical member, a bimetallic spiral spring member having one end thereof affixed to said first cylindrical member and the other end thereof affixed to said second cylindrical member, the inner surfaces of each of said cylindrical members being optically polished, means for mounting said heat radiating device concentrically within said second cylindrical member, a radiator member formed concentrically about said heat radiating device and extending radially outwardly therefrom, and means for adjustably imposing a predetermined loading on said bimetallic spring member whereby said first and second cylindrical member openings are coincident for a predetermined external ambient temperature and are circumferentially displaced to effect complete disalignment therebetween for a predetermined lower external ambient temperature.

2. A temperature regulated chamber as defined in claim 1 wherein each of said cylinder members is formed with an open end and a closed end, the open end of said first cylindrical member being formed with a plurality of circumferentially displaced through-holes, a plurality of ball members each rotatably received in one of said through-holes and in communication with the outer surface of said second cylindrical member, a bearing retaining ring circumferentially disposed about the open end of said first cylindrical member and in communication with said ball members, a bearing shaft affixed to and extending axially inwardly from said first cylindrical member, a bearing member affixed concentrically about the axis of the closed end of said second cylindrical member and rotatably mounted on said bearing shaft, said spiral spring member having the first end thereof affixed to said bearing shaft and the second end thereof affixed to said second cylindrical member.

3. A temperature regulated chamber as defined in claim 2 further including a stud member rotatably received and axially retained in the closed end of said second cylindrical member, the second end of said spiral spring member being affixed to said stud member, the free end of said stud member extending upwardly from the closed end of said second cylindrical member, an arcuate slot formed in the closed end of said first cylindrical member, said free end of said stud member communicating with said arcuate slot, the ends of said slot thereby providing a limit for relative rotation between said first and second cylindrical members.

4. A temperature regulated chamber as defined in claim 3 wherein said confined heat radiating device includes a rotatable adjusting means, said chamber including a selectively insertable adjusting member mounted on said first cylindrical member and receivable through an opening formed in said first cylindrical member, said second cylindrical member being formed with a circumferentially extending slot through which said adjusting member is into cooperative engagement with said rotatable adjusting means, whereby insertion of said adjusting member and engagement thereof with said rotatable adjusting means may be effected while permitting relative rotation between said first and second cylindrical members.

5. A temperature regulated chamber as defined in claim 2 including a base member affixed to said first cylindrical member, a mounting socket for said heat radiating device affixed to said base member and extending therethrough, clamping means extending from said base member into selective communication with said heat radiating device, said base member being formed as a flanged cap receivable within said first cylindrical member, a plurality of through-holes formed in said first cylindrical member beneath said ball retaining through-holes and coincident with like-disposed through-holes formed in said bearing retaining ring, and a plurality of fastening means received through said base member and retaining ring through-holes and into threaded engagement with said base member.

References Cited in the file of this patent
UNITED STATES PATENTS

| | | |
|---|---|---|
| 1,955,560 | Payne | Apr. 17, 1934 |
| 2,073,450 | Thurston | Mar. 9, 1937 |
| 2,101,135 | Finch et al. | Dec. 7, 1937 |